(12) United States Patent
Pierce et al.

(10) Patent No.: US 11,113,854 B2
(45) Date of Patent: Sep. 7, 2021

(54) METHODS AND DEVICES FOR CAPTURING HEURISTIC INFORMATION VIA A SKETCHING TOOL

(71) Applicant: DecisionNext, Inc., San Francisco, CA (US)

(72) Inventors: Robert David Pierce, Berkeley, CA (US); David Rodriguez Gomez, Redwood City, CA (US); Arden Martin Arnold, San Francisco, CA (US); Michael R. Neal, San Francisco, CA (US)

(73) Assignee: DECISIONNEXT, INC., San Francisco, CA (US)

( * ) Notice: Subject to any disclaimer, the term of this patent is extended or adjusted under 35 U.S.C. 154(b) by 0 days.

(21) Appl. No.: 16/299,350

(22) Filed: Mar. 12, 2019

(65) Prior Publication Data
US 2020/0294290 A1 Sep. 17, 2020

(51) Int. Cl.
| | |
|---|---|
| *G06T 11/20* | (2006.01) |
| *G06F 3/0488* | (2013.01) |
| *G06T 11/80* | (2006.01) |
| *G06F 3/0484* | (2013.01) |

(52) U.S. Cl.
CPC ........ *G06T 11/206* (2013.01); *G06F 3/04883* (2013.01); *G06T 11/80* (2013.01)

(58) Field of Classification Search
CPC ..... G06T 11/206; G06T 11/80; G06F 3/04883
See application file for complete search history.

(56) References Cited

U.S. PATENT DOCUMENTS

| | | | | |
|---|---|---|---|---|
| 7,801,798 | B1* | 9/2010 | Huemer | G06Q 10/04 705/35 |
| 2007/0198328 | A1* | 8/2007 | Fuller | H04L 67/1097 711/170 |
| 2008/0192069 | A1* | 8/2008 | Wanzke | G06Q 40/04 345/619 |
| 2009/0106282 | A1* | 4/2009 | Silverman | G06F 16/258 |
| 2010/0191790 | A1* | 7/2010 | Kincaid | G06F 17/15 708/274 |
| 2012/0302941 | A1* | 11/2012 | Teodorescu | A61F 9/00745 604/22 |
| 2013/0100158 | A1* | 4/2013 | Honji | G06F 3/0418 345/619 |
| 2016/0124074 | A1* | 5/2016 | Wonneberger | G01S 5/163 356/4.01 |

* cited by examiner

*Primary Examiner* — Sing-Wai Wu
(74) *Attorney, Agent, or Firm* — Fernando & Partners, LLP

(57) ABSTRACT

In accordance with various embodiments, a method is performed at an electronic device including a display device and one or more input devices. The method includes displaying, on the display device, a first graphing area including a first section presenting a plot of a first set of data points for a first variable and a second section. The method includes detecting, via the one or more input devices, a user input indicative of a path within a second section. The method includes determining, based on the user input indicative of a path within the second section, a second set of data points for the first variable. The method includes determining, based at least on the second set of data points for the first variable, a set of data points for a second variable. The method includes displaying, on the display device, a second graphing area presenting a plot of the set of data points for the second variable.

19 Claims, 15 Drawing Sheets

METHODS AND DEVICES FOR CAPTURING HEURISTIC INFORMATION VIA A SKETCHING TOOL

TECHNICAL FIELD

The present disclosure generally relates generally to user interfaces for manipulating data.

BACKGROUND

When modeling a multi-variate system, data can be obtained from a number of different sources in a number of different forms. This data can be used to generate predicted data based on one or more models. However, it is difficult to integrate expert heuristic information (based on their expertise or proprietary information) into the modeling.

BRIEF DESCRIPTION OF THE DRAWINGS

For a better understanding of aspects of the various embodiments described herein and to show more clearly how they may be carried into effect, reference is made, by way of example only, to the accompanying drawings.

Figure 1:
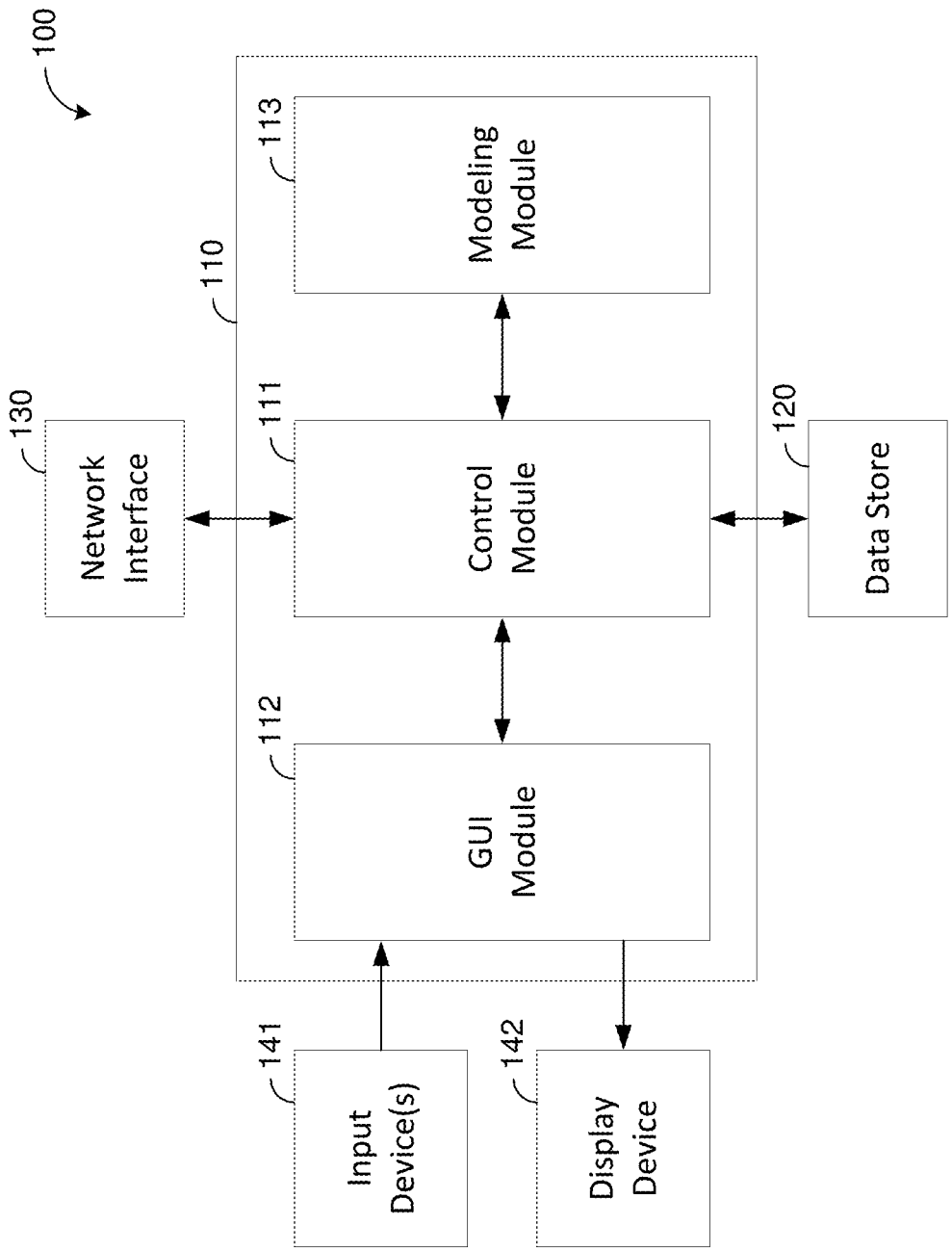
FIG. 1 is a block diagram of a modeling system in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example embodiments described herein.

Various embodiments disclosed herein include devices, systems, and methods for displaying modeled data. In various embodiments, a method performed at an electronic device including a display device and one or more input devices includes displaying, on the display device, a first graphing area including a first section presenting a plot of a first set of data points for a first variable and a second section. The method includes detecting, via the one or more input devices, a user input indicative of a path within a second section. The method includes determining, based on the user input indicative of a path within the second section, a second set of data points for the first variable. The method includes determining, based at least on the second set of data points for the first variable, a set of data points for a second variable. The method includes displaying, on the display device, a second graphing area presenting a plot of the set of data points for the second variable.

In accordance with some embodiments, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some embodiments, a non-transitory computer readable storage medium has stored therein instructions, which, when executed by one or more processors of a device, cause the device to perform or cause performance of any of the methods described herein. In accordance with some embodiments, a device includes: one or more processors, a non-transitory memory, and means for performing or causing performance of any of the methods described herein.

As noted above, a modeling system can use data obtained from a number of different sources in a number of different formats to generate predicted data based on one or more models. In general, the accuracy of the model increases when more data is provided to system. However, it is difficult to integrate expert heuristic information from a user (e.g., data based on the user's expertise or proprietary information otherwise unavailable) into the modeling. To that end, in various implementations, a number of user interface enhancements are provided as an efficient mechanism for capturing the expert heuristic information.

For example, a biometric modeling system can obtain calorie expenditure data from a wearable device (such as a smartwatch), obtain calorie intake data input via a calorie-counting application, and, using one or more biometric models, generate modeled data regarding body size. In various implementations, a user interface enhancement is provided that allows a user to efficiently provide information regarding future calorie expenditure or calorie intake (e.g., based on user knowledge that cannot otherwise be efficiently captured) and see the future effect on body size. In various implementations, a user interface enhancement is provided that allows a user to change the weighting of particular data points used in the one or more models. For example, knowing that calorie expenditure data for a particular month was unusually high or calorie intake data for a particular month was unusually low, a user interface enhancement is provided that allows the user to lower the modeling weights for data points corresponding to that particular month and see the effect on body size. In various implementations, the one or more models calculate a relationship between variables (e.g., a covariance between the calorie expenditure data and the calorie intake data). In various implementations, a user interface enhancement is provided that allows a user to efficiently provide information regarding this relationship. For example, knowing that calorie expenditure is more dependent on calorie intake than the model deduces based on the obtained data, the user can efficiently change the covariance used in calculating body size.

As another example, a climate modeling system can obtain $CO_2$-level data from a freely-available online source, obtain sea surface temperature data from a weather satellite, and, using one or more climate models, generate modeled data regarding glacial ice amounts. In various implementations, a user interface enhancement is provided that allows a user to efficiently provide information regarding future $CO_2$ levels or sea surface temperature and see the future effect on glacial ice amounts. In various implementations, a user interface enhancement is provided that allows a user to change the weighting in the one or more models of particular data points. For example, predicting that sea surface temperature in future years will more likely track that in a particular previous year, a user interface enhancement is provided that allows the user to increase the modeling weights for data points corresponding to that particular year and see the effect on glacial ice amounts. In various implementations, the one or more models calculate a relationship between variables (e.g., a covariance between the $CO_2$-level data and the sea surface temperature data). In various implementations, a user interface enhancement is provided that allows a user to efficiently provide information regarding this relationship. For example, knowing that sea surface temperature is less dependent on $CO_2$ levels than the model deduces based on the obtained data, the user can efficiently change the covariance used in calculating glacial ice amounts.

FIG. 1 illustrates a modeling system 100 in accordance with some embodiments. While pertinent features are shown, those of ordinary skill in the art will appreciate from the present disclosure that various other features have not been illustrated for the sake of brevity and so as not to obscure more pertinent aspects of the example embodiments disclosed herein. To that end, as a non-limiting example, the modeling system 100 includes a processor 110 coupled to a data store 120, a network interface 130, one or more input devices 141, and a display device 142. The processor 110 includes a control module 111, a graphical user interface (GUI) module 112, and a modelling module 113.

In various implementations, the data store 120 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. In various implementations, the data store 120 stores modeling data input obtained via the one or more input devices 141 or via the network interface 130 (e.g., from a private or public network, such as the Internet). In various implementations, modeling data is obtained in various ways. For example, in various implementations, the modeling data is obtained via the network interface from one or more online sources. As another example, in various implementations, the modeling data is obtained via the one or more input devices 141, either automatically or manually input by a user.

The modeling module 113 generates modeled data based on the modeling data and one or more models. In various implementations, the one or more models include functional relationships between two or more variables. In various implementations, the models includes a Markov Chain based model, e.g., a Markov regression model. In various implementations, the models include a Monte Carlo based model.

The GUI module presents the modeling data and/or the modeled data in a graphical user interface via the display device 142 and the one or more input devices 141.

The control module 111 coordinates the various elements of the modeling system 100 to achieve the functions described above and further below.

FIGS. 2A-2L illustrate example user interfaces for displaying modeled data in accordance with some embodiments. The user interfaces in these figures are used to illustrate the processes described below, including the process in FIG. 3.

Figure 2A:
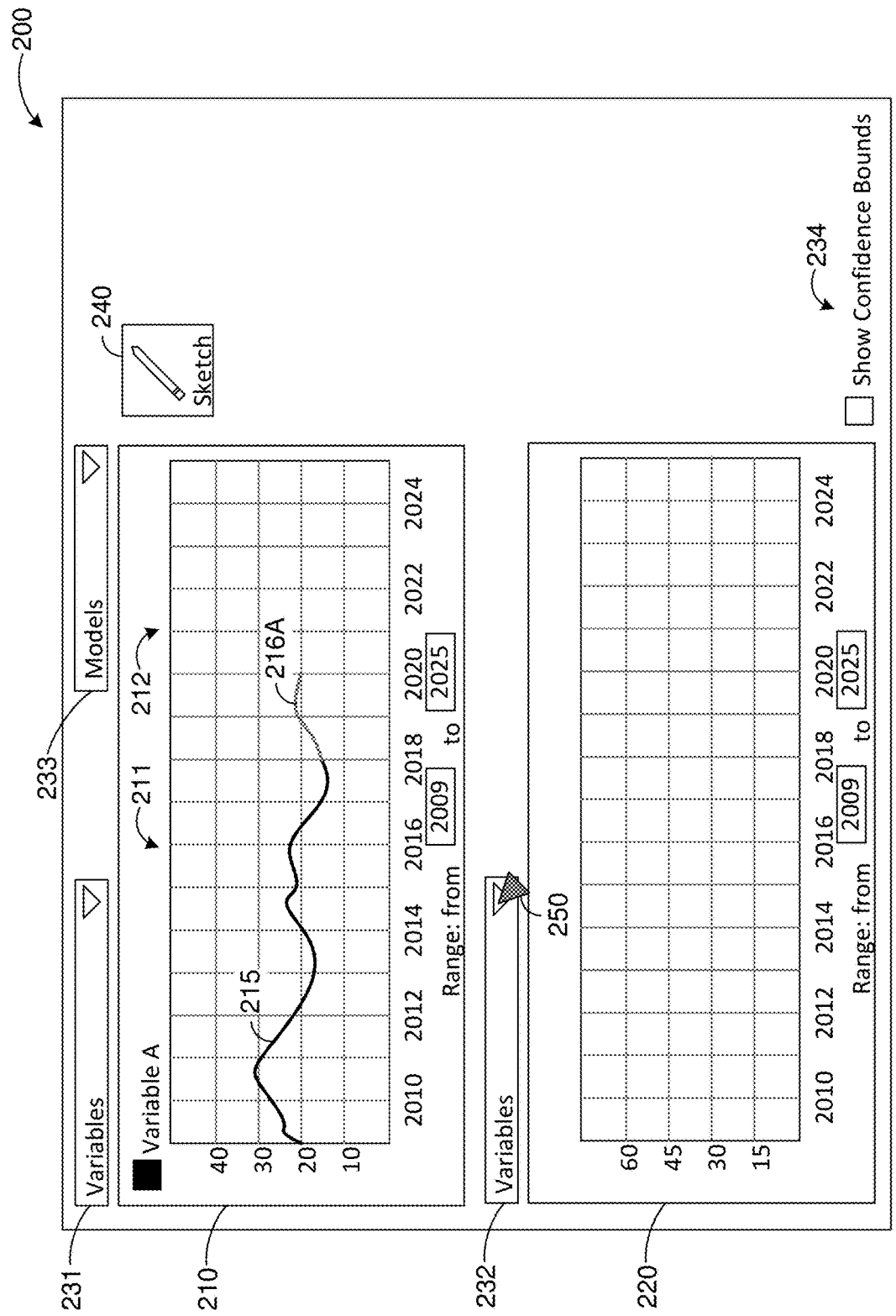
FIGS. 2A-2L illustrate example user interfaces for displaying modeled data in accordance with some embodiments.

FIG. 2A illustrates a user interface 200 including a first graphing area 210 and a second graphing area 220. Although FIG. 2A illustrates the second graphing area 220 separate from the first graphing area 210, in various implementations, the second graphing area 220 is displayed on top of the first graphing area 210.

The first graphing area 210 includes a first section 211 presenting a plot 215 of a first set of data points for a first variable (e.g., Variable A). The first graphing area 210 includes a second section 212 presenting a plot 216A of second set of data points for the first variable. In various implementations, the first set of data points for the first variable represents observed data for the first variable (e.g., stored in the data store 120 of FIG. 1), such as historical data. In various implementations, the second set of data points for the first variable represents computed data for the first variable, such as predicted data or modeled data, based on one or more models.

The first graphing area 210 is associated with a first variable selection affordance 231 that, when selected, allows a user to select which variable (or set of variables) is represented in the first graphing area 210. The second graphing area 220 is associated with second variable selection affordance 232 that, when selected, allows the user to select which variable (or set of variables) is represented in the second graphing area 220. The first graphing area 220 is also associated with model selection affordance 233 that, when selected, allows the user to select which model (or set of models) is used (e.g., by the modeling module 113 of FIG. 1) to generate computed data.

The user interface 200 also includes a confidence toggle affordance 234 that, when selected, toggles the display of confidence bounds of plots in the first graphing area 210 and/or the second graphing area 220.

The user interface 200 includes a sketch affordance 240 that, when selected and as described further below, allows a user to draw a path within the first graphing area 210 defining a set of data points for the first variable that are used (e.g., by the modeling module 113 of FIG. 1) to generate computed data displayed in the second graphing area 220.

The user interface 200 includes a cursor 250. FIG. 2A illustrates the cursor 250 at the location of the second variable selection affordance 232.

Figure 2B:
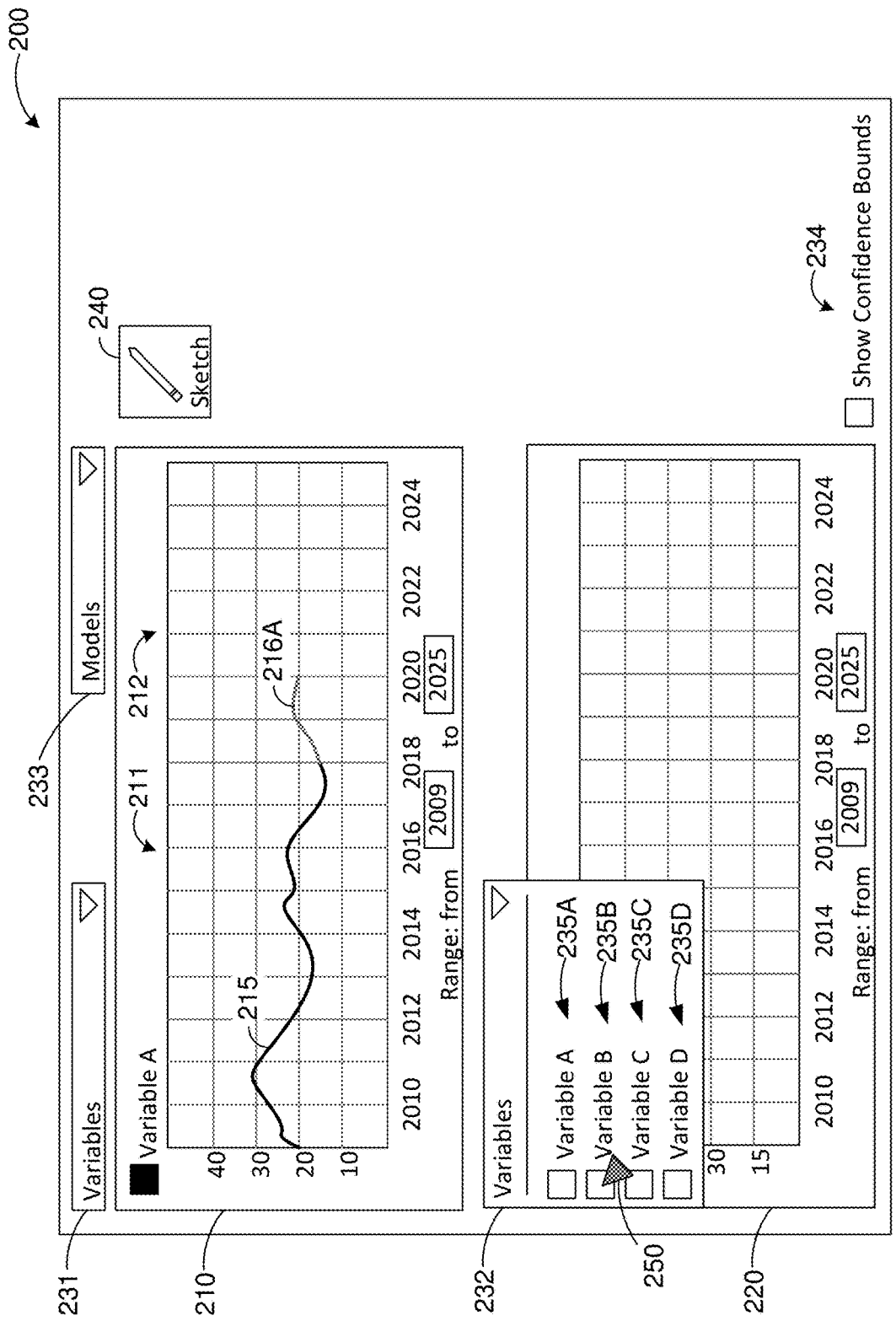

FIG. 2B illustrates the user interface 200 of FIG. 2A in response to detecting a user input corresponding to selection of the second variable selection affordance 232. In the user interface 200 of FIG. 2B, the second variable selection affordance 232 is expanded as a drop-down menu to include a plurality of variable display toggle affordances 235A-235D that, when selected, toggle display of a plot of data points for a respective variable.

FIG. 2B illustrates the cursor 250 at the location of a second variable display toggle affordance 235B of the plurality of variable display toggle affordances 235A-235D.

Figure 2C:
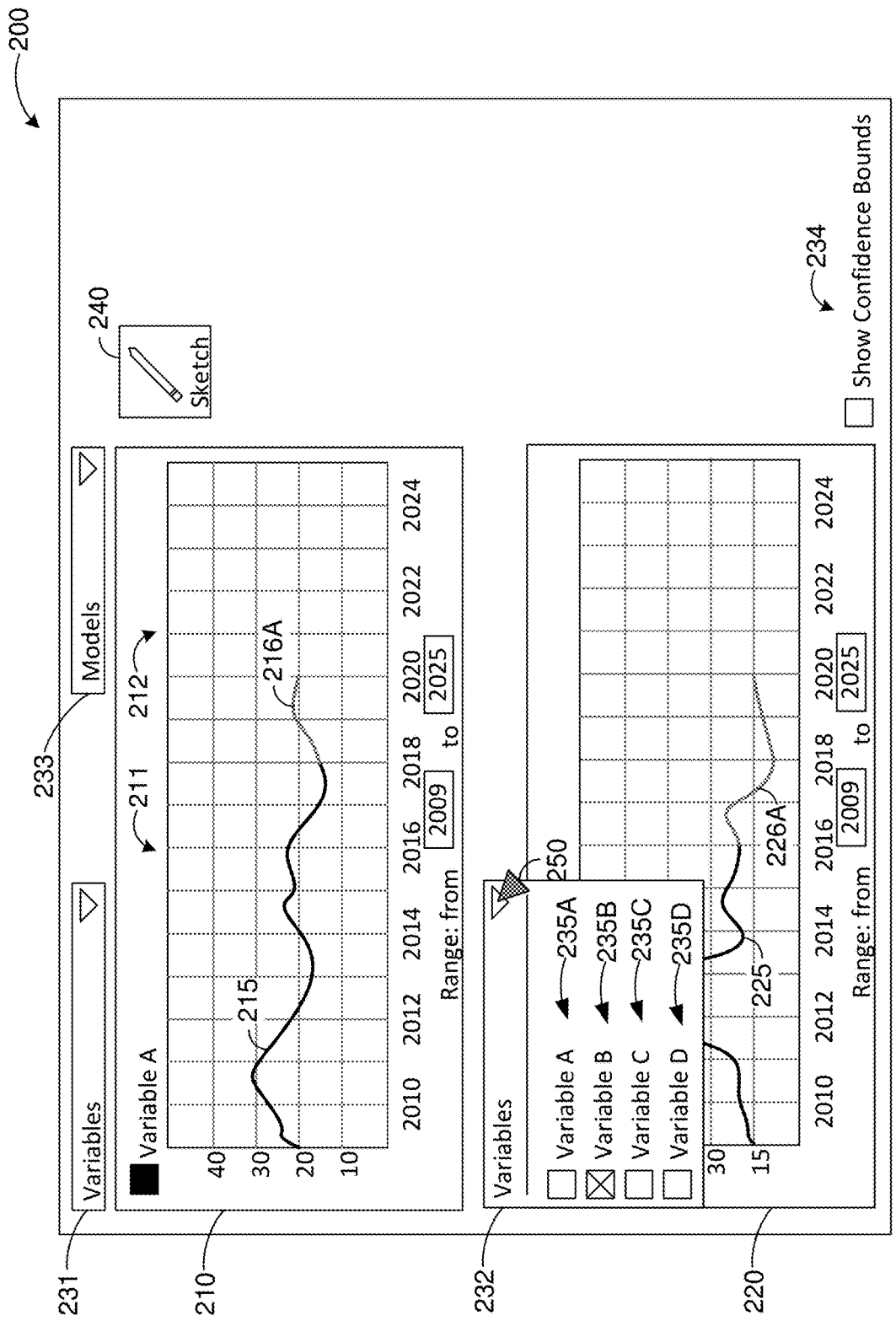

FIG. 2C illustrates the user interface 200 of FIG. 2B in response to detecting a user input corresponding to selection of the second variable display toggle affordance 235B. In the user interface 200 of FIG. 2C, the second variable display toggle affordance 235B is toggled (e.g., activated), resulting in second graphing area 220 presenting a plot 225 of a first set of data points for the second variable (e.g., Variable B) representing observed data, and a plot 226A of a second set of data points for the second variable represented computed data. In various implementations, the second set of data points for the second variable are generated according to a model (e.g., a first model) applied to the first set of data points for the first variable and the first set of data points for the second variable (and, optionally, additional data points for the first variable, additional data points for the second variable, and/or data points for additional variables).

FIG. 2C illustrates the cursor 250 at the location of the second variable selection affordance 232.

Figure 2D:
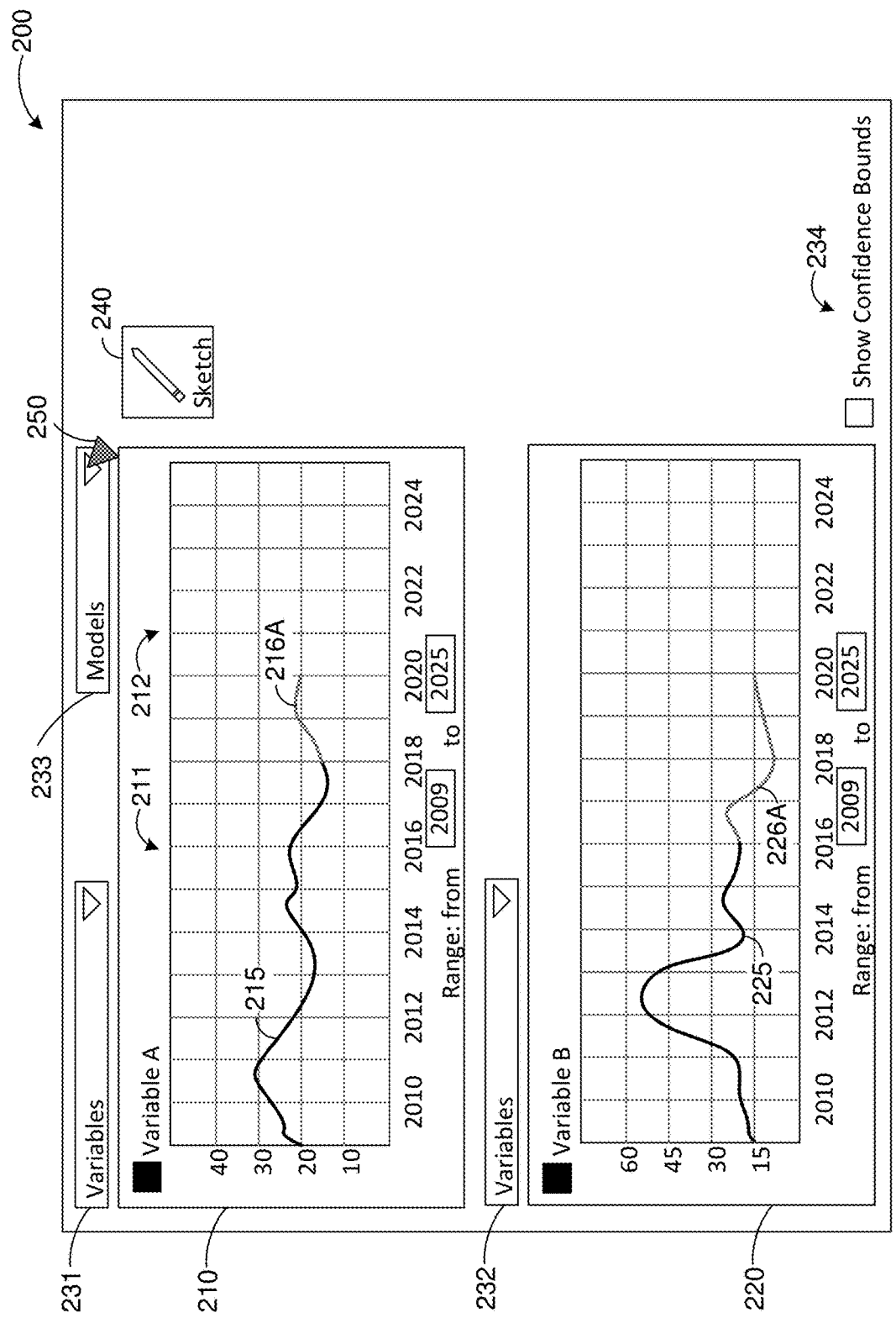

FIG. 2D illustrates the user interface 200 of FIG. 2C in response to detecting a user input corresponding to a selection of the second variable selection affordance 232. In the user interface 200 of FIG. 2D, the second variable selection affordance 232 is de-expanded to the state shown in FIG. 2A.

FIG. 2D illustrates the cursor 250 at the location of the model selection affordance 233.

Figure 2E:
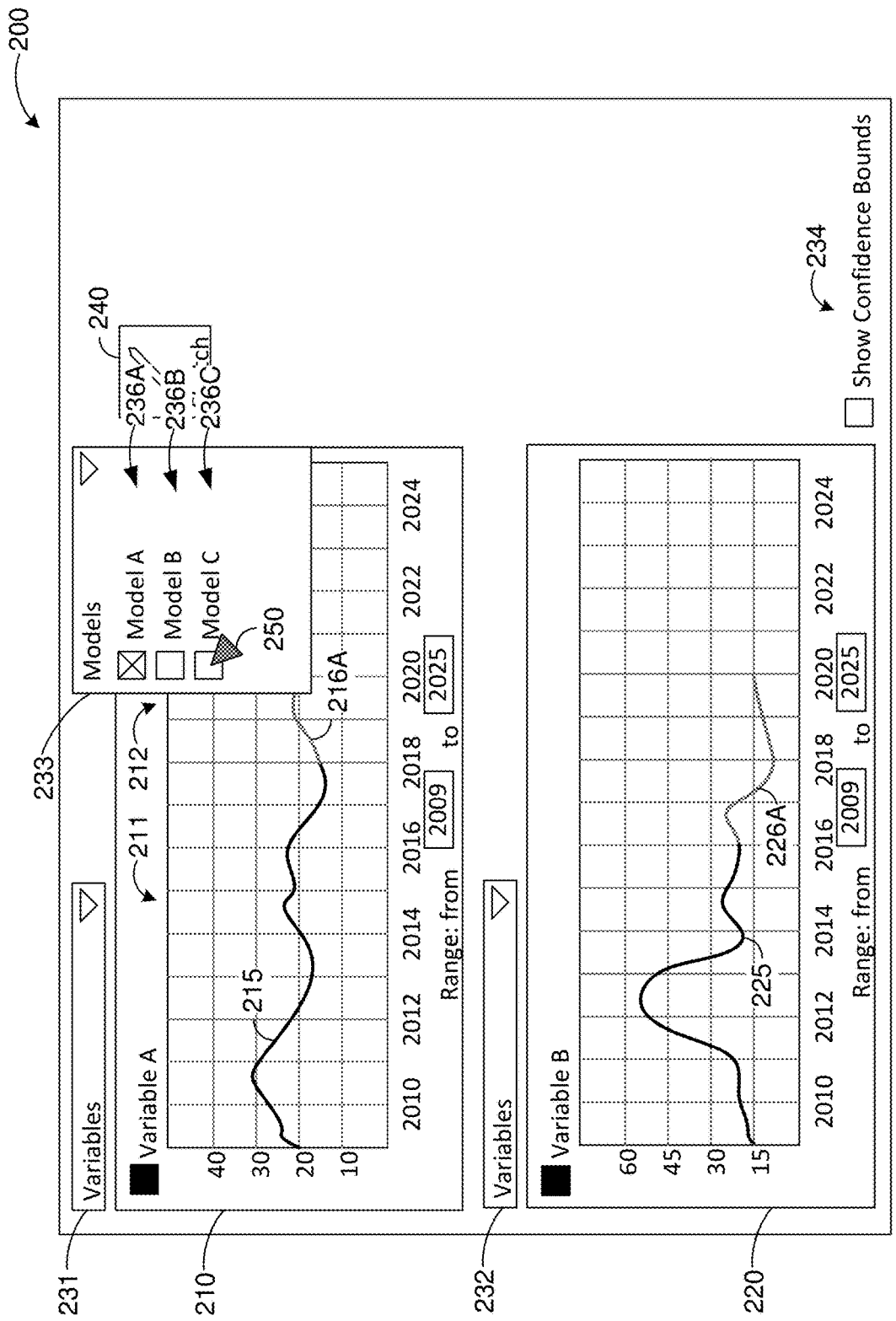

FIG. 2E illustrates the user interface 200 of FIG. 2D in response to detecting a user input corresponding to selection of the model selection affordance 233. In the user interface 200 of FIG. 2E, the model selection affordance 233 is expanded as a drop-down menu to include a plurality of model affordances 236A-236C that, when selected, specify a model used (e.g., by the modeling module 113 of FIG. 1) to generate the second set of data points for the first variable represented to plot 216A and the second set of data points for the second variable represented by the plot 226A.

FIG. 2E illustrates the cursor 250 at the location of a third model affordance 236C of the plurality of model affordances 236A-236C.

Figure 2F:
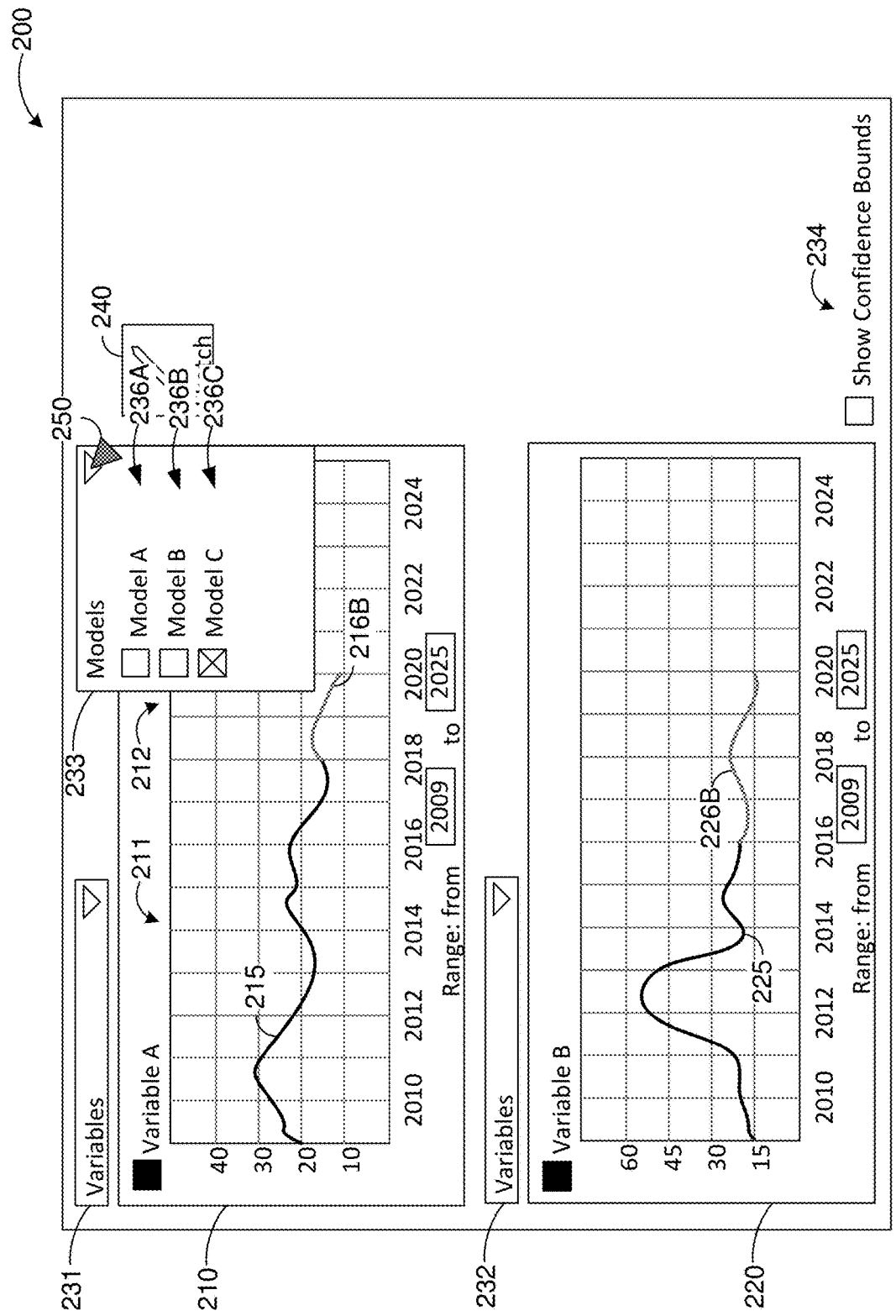

FIG. 2F illustrates the user interface 200 of FIG. 2E in response to detecting a user input corresponding to selection of the third model affordance 236C. In the user interface 200 of FIG. 2F, the third model affordance 236C is toggled (e.g., activated) and the first model affordance 236A is toggled (e.g., deactivated). In various implementations, multiple model affordances are simultaneously activated and multiple plots of the same variable (generated by different models) are displayed in the first graphing area 210 and/or the second graphing area 220. In the user interface 200 of FIG. 2F, the plot 216A representing the second set of data points for the first variable generated according to the first model and the plot 225 representing the second set of data points for the second variable generated according to the first model are replaced with a plot 216B representing the a second set of data points for the first variable generated according to the third model and a plot 226B representing a set of data points for the second variable generated according to the third model, e.g., applied to the first set of data points for the first variable and the first second of data points for the second variable (and, optionally, additional data points for the first variable, additional data points for the second variable, and/or data points for additional variables).

FIG. 2F illustrates the cursor 250 at the location of the model selection affordance 233.

Figure 2G:
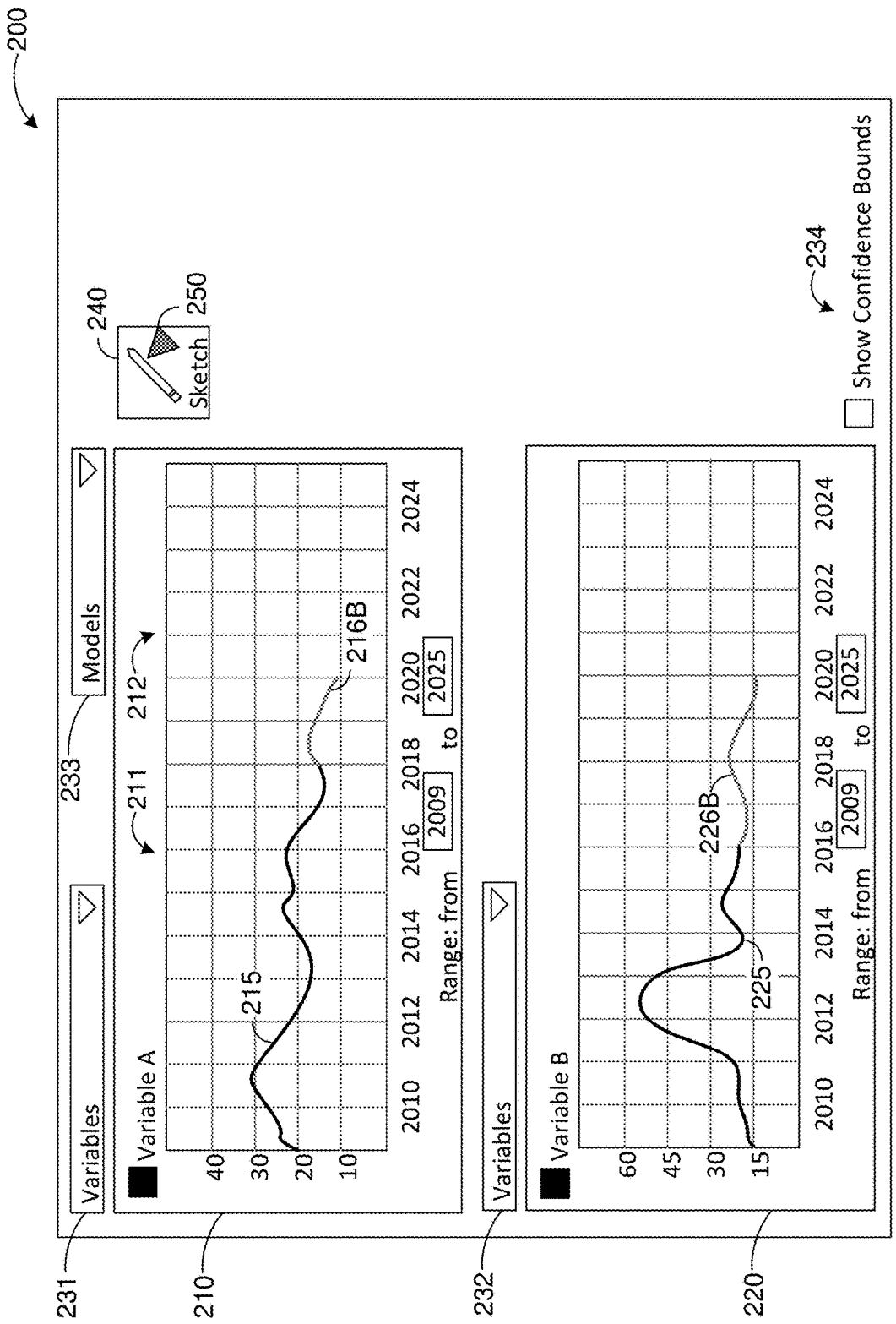

FIG. 2G illustrates the user interface 200 of FIG. 2F in response to detecting a user input corresponding to selection of the model selection affordance 233. In the user interface 200 of FIG. 2G, the model selection affordance 233 is de-expanded to the state shown in FIG. 2A.

FIG. 2G illustrates the cursor 250 at the location of the sketch affordance 240.

Figure 2H:
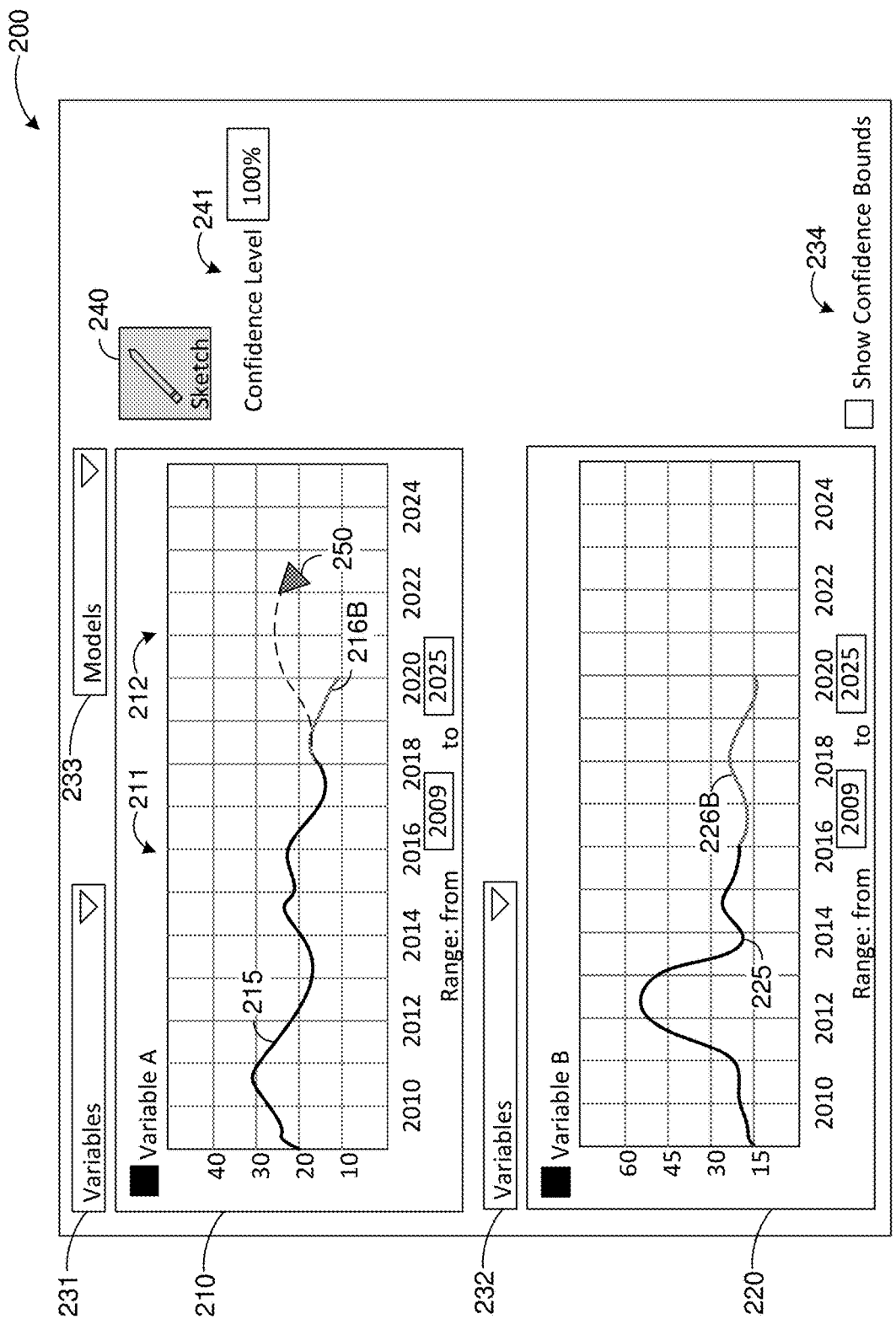

FIG. 2H illustrates the user interface 200 of FIG. 2G in response to detecting a user input corresponding to selection of the sketch affordance 240. In the user interface 200 of FIG. 2H, the sketch affordance 240 is changed to indicate that a sketch mode is activated. Further, the user interface 200 includes a confidence level affordance 241 that, when selected, allows a user to select a confidence level for data input while in the sketch mode.

FIG. 2H illustrates the cursor 250 moving along a path within the second section 212 of the first graphing area 210.

Figure 2I:
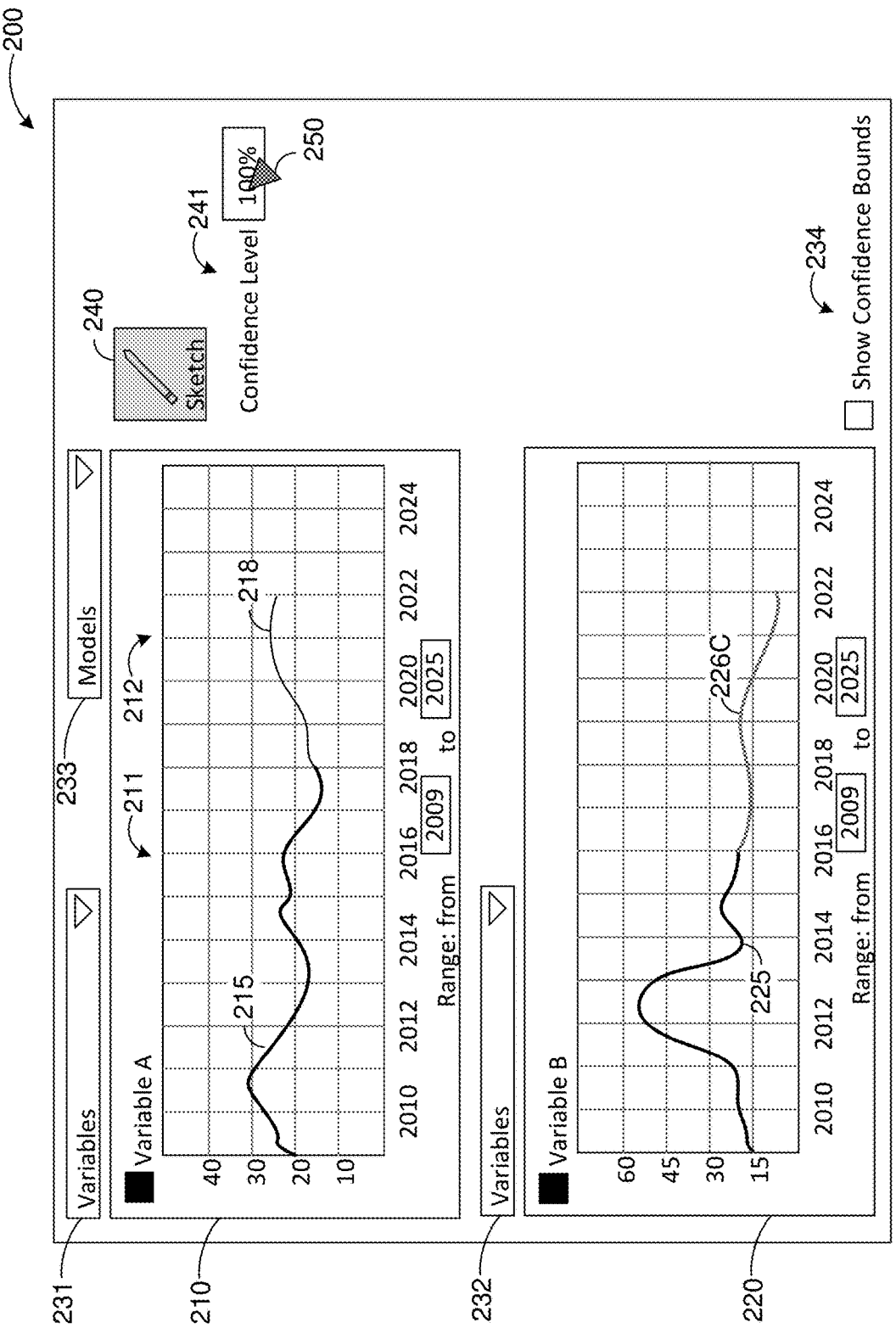

FIG. 2I illustrates the user interface 200 of FIG. 2H in response to detecting a user input indicative of a path within the second section 212. In the user interface 200 of FIG. 2I, the second section 212 of the first graphing area 210 includes a plot 218 of a second set of data points for the first variable. In various implementations, the second set of data points for the first variable are determined based on the user input (e.g., based on the path within the second section 212). Thus, in various implementations, the second set of data points for the first variable represents expert heuristic information and/or opinion data. Further, in the user interface 200 of FIG. 2I, in the second graphing area 220, the plot 226B representing the second set of data points for the second variable generated according to the third model applied to the first set of data points for the first variable and the first set of data points for the second variable is replaced by a plot 226C representing a second set of data points for the second variable generated according to the third model applied to, additionally, the second set of data points for the first variable represented by the plot 218 (e.g., the opinion data).

FIG. 2I illustrates the cursor 250 at the location of the confidence level affordance 241.

Figure 2J:
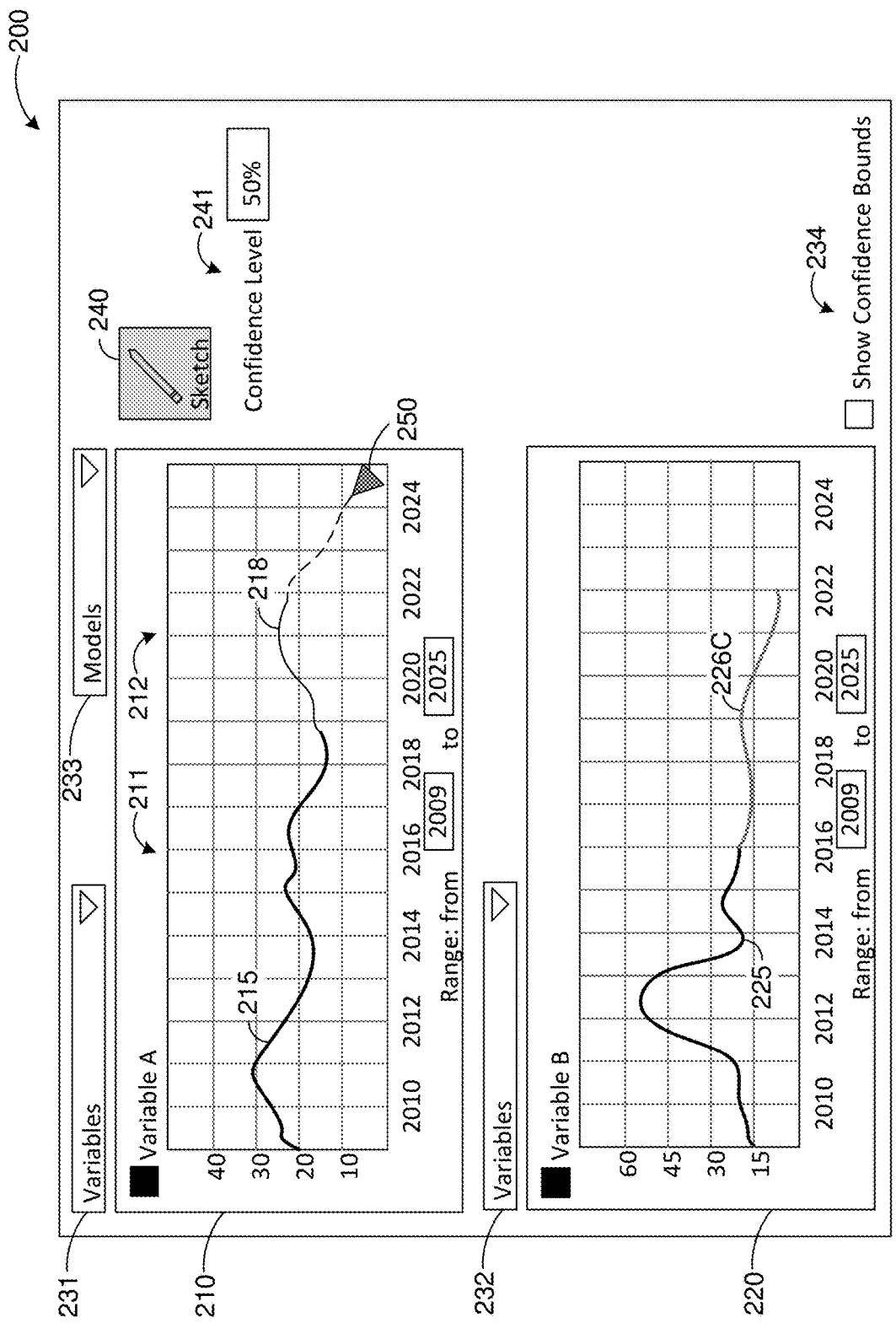

FIG. 2J illustrates the user interface 200 of FIG. 2I in response to detecting a user input corresponding to selection of the confidence level affordance 241 (and user input corresponding to a selection of a confidence level of 50%). In the user interface 200 of FIG. 2J, the confidence level affordance 241 indicates a confidence level of 50%.

FIG. 2J illustrates the cursor 250 moving along a path within the second section 212 of the first graphing area 210.

Figure 2K:
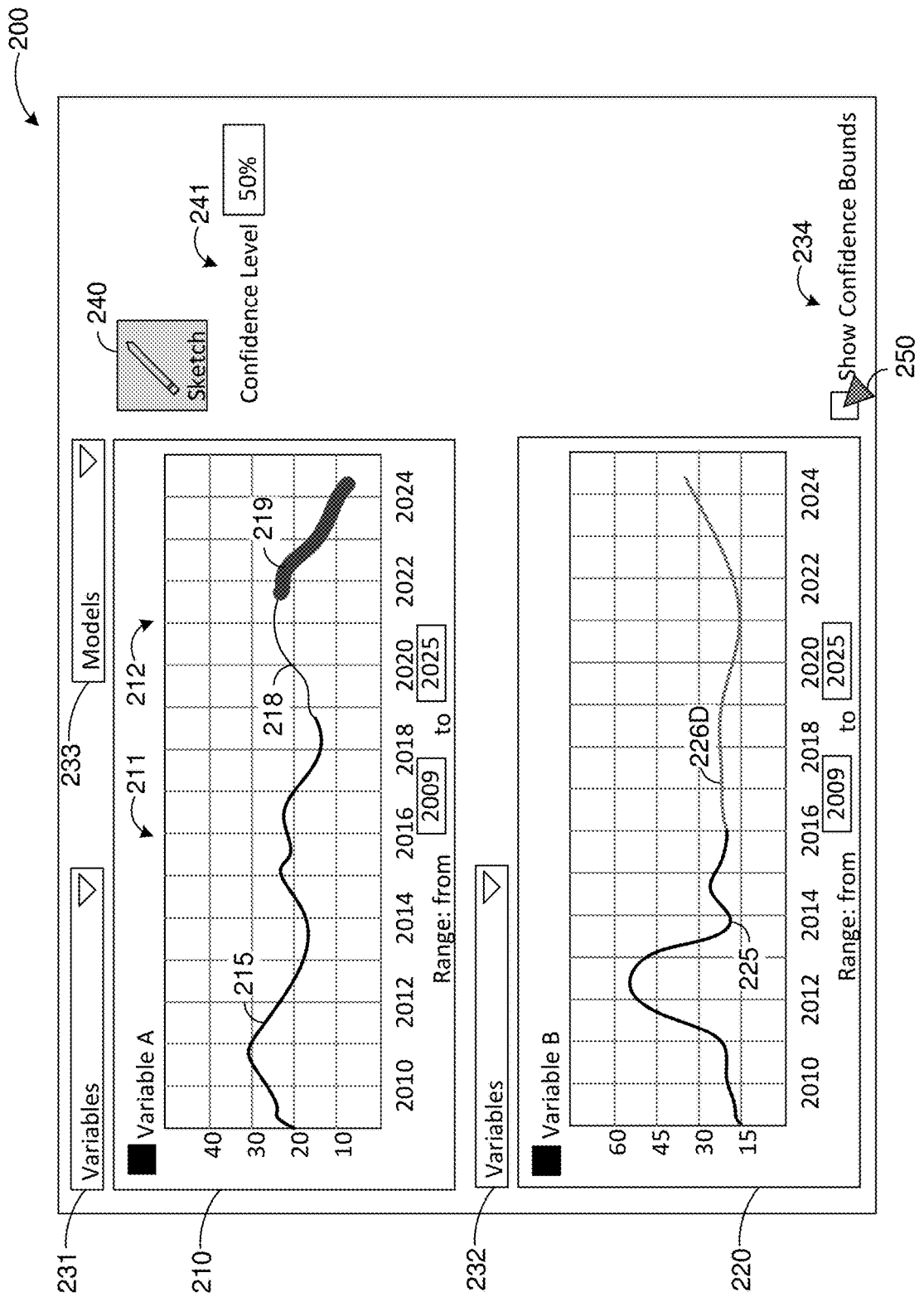

FIG. 2K illustrates the user interface 200 of FIG. 2J in response to detecting a user input indicative of a path within the second section 212. In the user interface 200 of FIG. 2K, the second section 212 of the first graphing area 210 includes a plot 219 of a third set of data points for the first variable. In various implementations, the third set of data points for the first variable are determined based on the user input (e.g., based on the path within the second section 212). In various implementations, the plot 219 of the third set of data points is indicative of the confidence level. Accordingly, in FIG. 2K, the plot 218 of the second set of data points is illustrated as fine line, whereas the plot 219 of the third set of data points is illustrated as a wide line.

Further, in the user interface 200 of FIG. 2K, in the second graphing area 220, the plot 226C representing a set of data points for the second variable generated according to the third model applied to, among other things, the second set of data points for the first variable is replaced by a plot 226D representing a set of data points for the second variable generated according to the third model applied to, additionally, the third set of data points for the first variable.

FIG. 2K illustrates the cursor 250 at the location of the confidence toggle affordance 234.

Figure 2L:
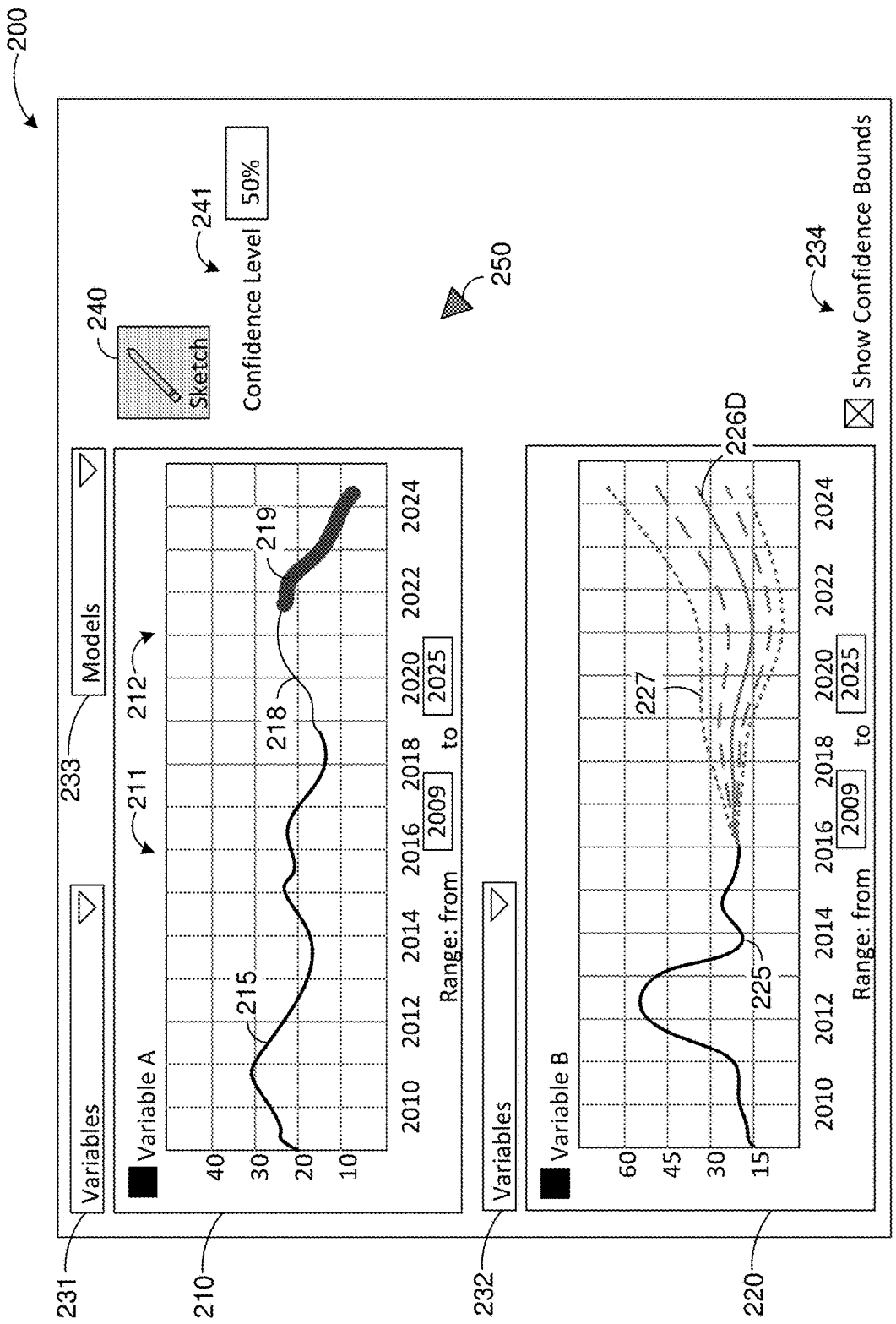

FIG. 2L illustrates the user interface 200 of FIG. 2K in response to detecting a user input corresponding to selection of the confidence toggle affordance 234. In FIG. 2L, the confidence toggle affordance 234 is toggled (e.g., activated), resulting in the display of confidence bounds 227 in the second graphing area 220 indicating, e.g., percentile bounds generated by the third model.

Figure 3:
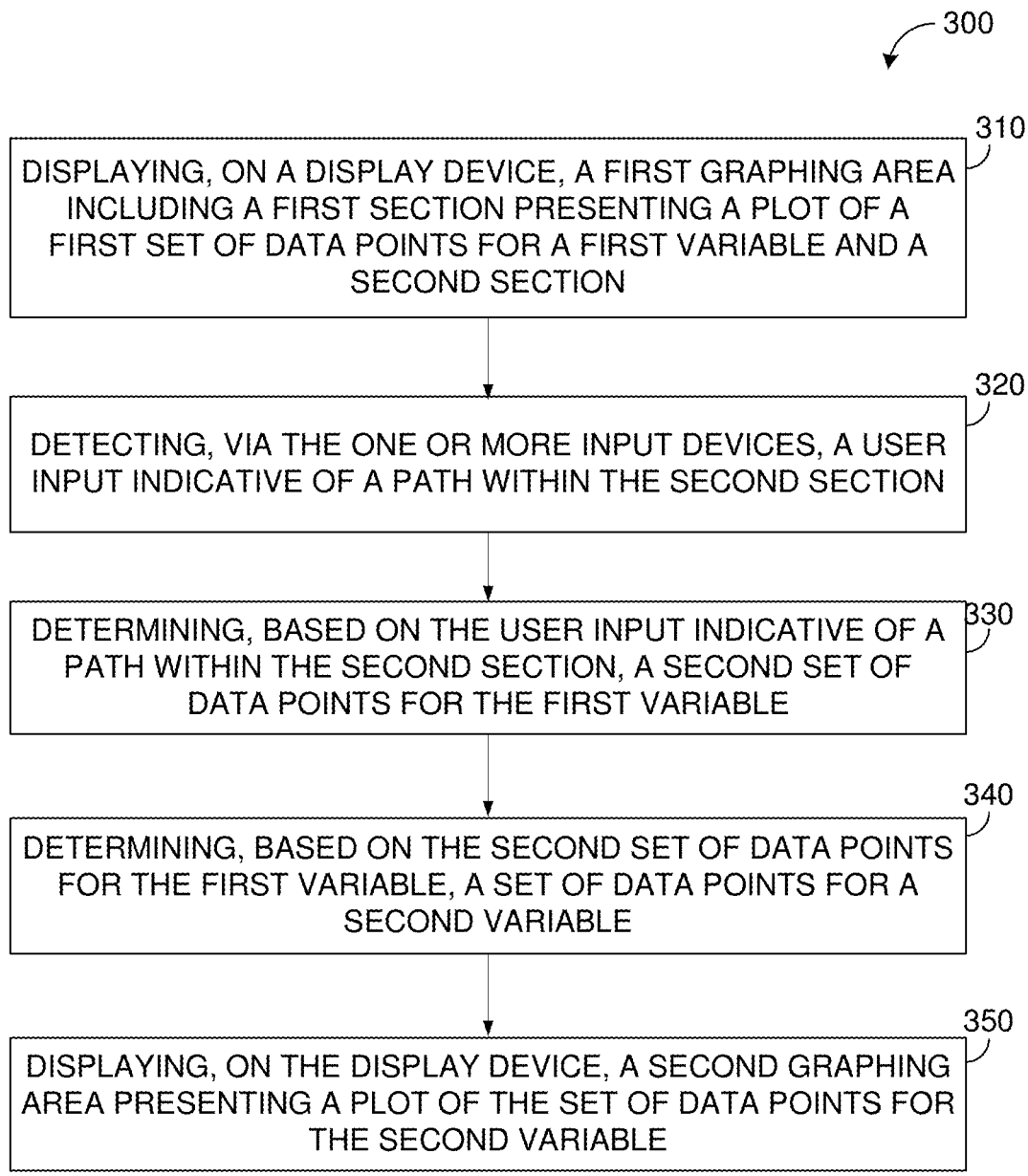
FIG. 3 is a flowchart representation of a method of displaying modeled data in accordance with some embodiments.

FIG. 3 is a flowchart representation of a method 300 of displaying modeled data in accordance with some embodiments. In some embodiments (and as detailed below as an example), the method 300 is performed by modeling system, such as the modeling system 100 of FIG. 1, or a portion thereof. In some embodiments, the method 300 is performed by an electronic device with a display device and one or more input devices. In some embodiments, the method 300 is performed by processing logic, including hardware, firmware, software, or a combination thereof. In some embodiments, the method 300 is performed by a processor executing code stored in a non-transitory computer-readable medium (e.g., a memory).

The method 300 begins, in block 310, with the modeling system displaying, on the display device, a first graphing area including a first section presenting a plot of a first set of data points for a first variable and a second section. For example, in FIG. 2A, the user interface 200 includes the first graphing area 210 including the first section 211 presenting a plot 215 of a first set of data points for the first variable and the second section 212 (presenting a plot 216A of a preliminary set of data points for the first variable).

In various implementations, the first set of data points for the first variable represents the value of a variable over time. Thus, in various implementations, each of the first set of data points for the first variable includes a first value (e.g., a time value) and a corresponding second value (e.g., a variable value). In various implementations, the first set of data points for the first variable represents, for example only, a population over time, a communications network bandwidth over time, a cost over time, a drug efficacy over time, or a user biometric over time.

In various implementations, the modeling system further determines, based at least on the first set of data points for the first variable, a preliminary set of data points for the second variable and displays, on the display device, a second graphing area presenting a plot of the preliminary set of data points for the second variable. For example, in FIG. 2C, the user interface 200 includes the second graphing area 220 presenting the plot 226A of a set of data points for the second variable generated according to a model applied to the first set of data points for the first variable (and, optionally, additional data points for the first variable and/or data points for additional variables).

The method 300 continues, in block 320, with the modeling system detecting, via the one or more input devices, a user input indicative of a path within the second section. For example, in FIG. 2H, the user interface illustrates the cursor 250 moving along a path within the second section 212. In various implementations, detecting the user input indicative of a path within the second section includes detecting movement of a mouse, while a mouse button is clicked, to effect movement of a corresponding cursor along the path. In various implementations, detecting the user input indicative of a path within the second section includes detecting contact (e.g., of a finger or a stylus) on a touch-sensitive surface moving along the path within the second section.

In various implementations, prior to detecting the user input indicative of a path within the second section, the modeling system detects a user input indicative of a selection of a sketch affordance that, when selected, activates a sketch mode. For example, in FIG. 2H, the user interface 200 indicates that the sketch affordance 240 has been selected and a sketch mode is activated. In various implementations, the modeling system performs the steps of block 330, 340, and 350 in response to detecting that a sketch mode is activated.

The method 300 continues, in block 330, with the modeling system determining, based on the user input indicative of a path within the second section, a second set of data points for the first variable. For example, in FIG. 2I, the user interface 200 includes a plot 218 of a second set of data points for the first variable determined based on the user input (e.g., based on the path within the second section 212). In various implementations, detecting the user input indicative of a path within the second section (in block 320) includes detecting a user input at a plurality of points of the path and determining the second set of data points for the first variable includes determining a data point for at least a subset of the plurality of points of the path. In particular, in various implementations, a data point is determined by determining a location on the display device of the point of the path and determining corresponding data point values based on the axes of the first graphing area. For example, in response to detecting a point of the path at a location on the display device corresponding to a time value of 2020 and a variable value of 22, a data point having a time value of 2020 and a variable value of 22 is determined as one of the second set of data points for the first variable.

In various implementations, the first set of data points for the first variable represents historical data at (past) times for which the variable value is known and the second set of data points for the first variable represents future data at (future) times for which the user predicts what the variable value will be. In various implementations, the first set of data points for the first variable represents incomplete data at various disjointed time periods for which the variable value is known and the second set of data points for the first variable represents bridging data at times between the disjointed time periods for which the user provides an estimate (or propriety information) of what the variable value was.

In some embodiments, the modeling system displays, on the display device, the second section presenting a plot of the second set of data points for the first variable. For example, in FIG. 2I, the user interface 200 includes the second section 212 presenting the plot 218 of the second set of data points for the first variable.

The method 300 continues, in block 340, with the modeling system determining, based at least on the second set of data points for the first variable, a set of data points for a second variable. In various implementations, the modeling system generates the set of data points for the second variable by applying a model to at least the second set of data points for the first variable. In various implementations, the modeling system further applies the model to the first set of data points for the first variable (e.g., observed data), such as the data represented by the plot 215. In various implementations, the modeling system further applies the model to another set of data points for the second variable (e.g., observed data), such as the data represented by the plot 225. In various implementations, the modeling system applies the model to other sets of data points for the first variable, second variable, and/or other variables.

In various implementations, the modelling system determines the set of data points for the second variable based on the preliminary set of data points for the second variable (e.g., the computed data, such as that represented by the plot 226B) and the second set of data points for the first variable (e.g., the opinion data, such as that represented by the plot 218).

The method 300 continues, in block 350, with the modeling system displaying, on the display device, a second graphing area presenting a plot of the set of points for the second variable. For example, in FIG. 2I, the user interface 200 includes the second graphing area 220 presenting the plot 226C representing a set of data points for the second variable generated according to a model applied to the second set of data points for the first variable (and, optionally, additional data points for the first variable, such as the first set of data points, and/or data points for additional variables).

In various implementations, the modeling system displays the second graphing area concurrently with the first graphing area. For example, in FIG. 2I, the user interface 200 includes the second graphing area 220 displayed concurrently with the first graphing area 210 (and the plot 226C of the set of data points for the second variable displayed concurrently with the plot 215 of the first set of data points for the first variable). In various implementations, the modeling system displays the second graphing area over the first graphing area.

In various implementations, the modeling system displays the second graphing area presenting a plot of the set of data points for the second variable based on detection of a user input corresponding to a selection of the second variable (from among a plurality of variables). Thus, in various implementations, the modeling system detects, via the one or more input devices, a user input corresponding to a selection of the second variable and displays the second graphing area presenting the plot of the set of data points for the second variable in response to detecting the user input corresponding to a selection of the second variable. For example, in FIG. 2C, the user interface 200 includes the second variable display toggle affordance 235B activated in response to a user input corresponding to selection of the second variable display toggle affordance 235B.

In various implementations, the modeling system detects, via the one or more input devices a user input indicative of a confidence of the path. For example, in FIG. 2J, the user interface 200 indicates that a user input indicative of a confidence level of 50% has been detected. Thus, in various implementations, the modeling system determines confidence values for the set of data points for a second variable based on the confidence level (e.g., according to the model). In various implementations, the modeling system displays, on the display device, the second graphing area presenting the plot of the set of data points for the second variable with a confidence of the set of data points for the second variable. For example, in FIG. 2L, the user interface 200 includes the confidence bounds 227 in the second graphing area 220 indicating, e.g., percentile bounds generated by the model.

Figure 4:
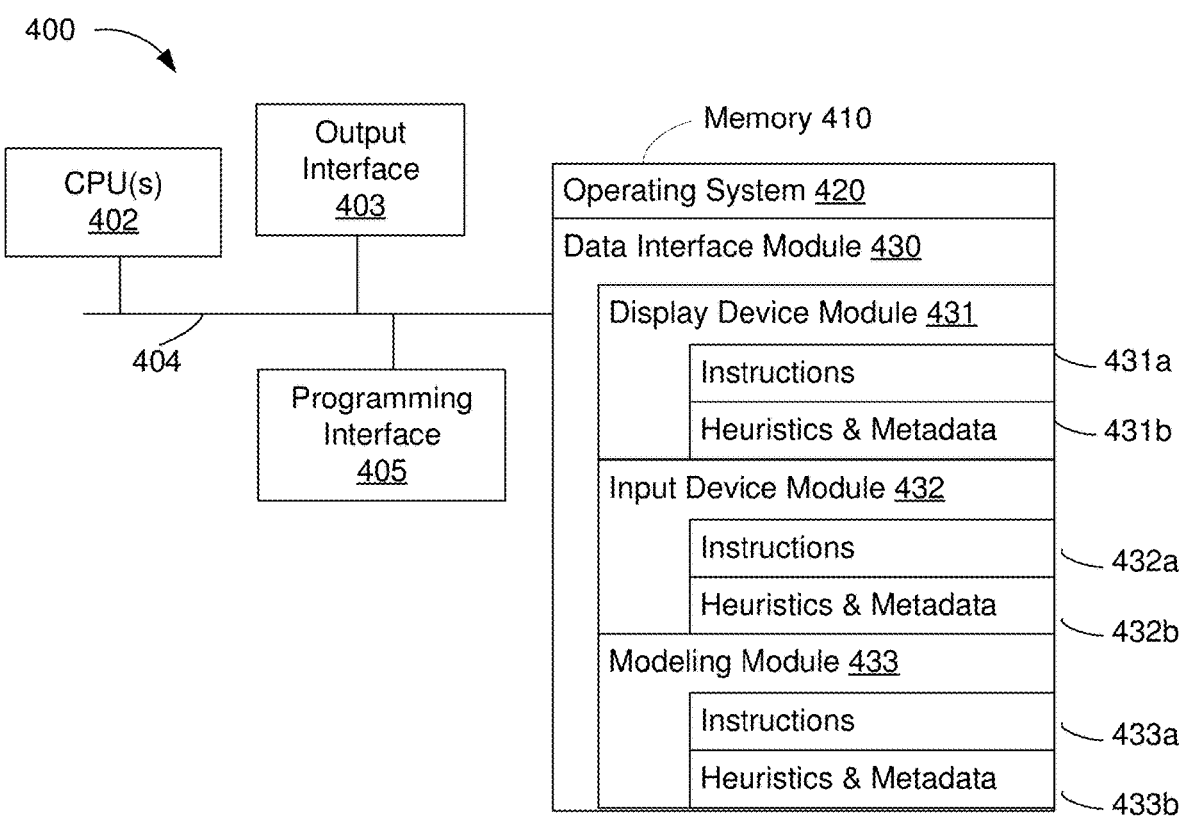
FIG. 4 is a block diagram of an example device in accordance with some embodiments.

FIG. 4 is a block diagram of an example device 400 in accordance with some embodiments. In some embodiments, the device corresponds to the modeling system 100 of FIG. 1 and performs one or more of the functionalities described above with respect to that system. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the device 400 includes one or more processing units (CPU(s)) 402 (e.g., processors), one or more output interfaces 403 (e.g., a network interface), a memory 410, a programming interface 405, and one or more communication buses 404 for interconnecting these and various other components.

In some embodiments, the communication buses 404 include circuitry that interconnects and controls communications between system components. The memory 410 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 410 optionally includes one or more storage devices remotely located from the CPU(s) 402. The memory 410 comprises a non-transitory computer readable storage medium. Moreover, in some embodiments, the memory 410 or the non-transitory computer readable storage medium of the memory 410 stores the following programs, modules and data structures, or a subset thereof including an optional operating system 420 and a data interface module 430 including a display device module 431, an input device module 432, and a modeling module 433. In some embodiments, one or more instructions are included in a combination of logic and non-transitory memory. The operating system 420 includes procedures for handling various basic system services and for performing hardware dependent tasks.

In some embodiments, the display device module 431 is configured to display, on a display device, a first graphing area including a first section presenting a plot of a first set of data points for a first variable and a second section. To that end, the display device module 431 includes a set of instructions 431a and heuristics and metadata 431b.

In some embodiments, the input device module 432 is configured to detect, via one or more input devices, a user input indicative of a path within a second section. To that end, the input device module 432 includes a set of instructions 432a and heuristics and metadata 432b.

In some embodiments, the modeling module 433 is configured to determine, based on the user input indicative of a path within the second section, a second set of data points for the first variable and to determine, based at least on the second set of data points for the first variable, a set of data points for a second variable. To that end, the modeling module 433 includes a set of instructions 433a and heuristics and metadata 433b.

In some embodiments, the display device module 431 is further configured to display, on the display device, a second graphing area presenting a plot of the set of data points for the second variable.

Although the display device module 431, the input device module 432, and the modeling module 433 are illustrated as residing on a single device 400, it should be understood that in other embodiments, any combination of the display device module 431, the input device module 432, and the modeling module 433 can reside in separate devices. For example, in some embodiments, each of the display device module 431, the input device module 432, and the modeling module 433 reside in a separate device.

Moreover, FIG. 4 is intended more as functional description of the various features which be present in a particular embodiment as opposed to a structural schematic of the embodiments described herein. As recognized by those of ordinary skill in the art, items shown separately could be combined and some items could be separated. For example, some functional modules shown separately in FIG. 4 could be implemented in a single module and the various functions of single functional blocks could be implemented by one or more functional blocks in various embodiments. The actual number of modules and the division of particular functions and how features are allocated among them will vary from one embodiment to another and, in some embodiments, depends in part on the particular combination of hardware, software, and/or firmware chosen for a particular embodiment.

While various aspects of embodiments within the scope of the appended claims are described above, it should be apparent that the various features of embodiments described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at an electronic device with a display device and one or more input devices:
   displaying, on the display device, a first graphing area including a first section presenting a plot of a first set of data points for a first variable and a second section;
   while displaying the first section presenting the plot of the first set of data points for the first variable:
   detecting, via the one or more input devices, a user input moving within the second section to define a path;
   determining, based on the path, a second set of data points for the first variable; and
   displaying, on the display device, the second section presenting a plot of the second set of data points for the first variable;
   determining, based at least on the second set of data points for the first variable, a set of data points for a second variable; and
   displaying, on the display device, a second graphing area presenting a plot of the set of data points for the second variable.

2. The method of claim 1, wherein determining the set of data points for the second variable is further based on the first set of data points for the first variable.

3. The method of claim 1, wherein determining the set of data points for the second variable is further based on another set of data points for the second variable.

4. The method of claim 1, further comprising, prior to detecting the user input:
   determining, based on the first set of data points for the first variable, a preliminary set of data points for the second variable; and
   displaying, on the display device, the second graphing area presenting a plot of the preliminary set of data points for the second variable.

5. The method of claim 4, wherein determining the set of data points for the second variable is based on the preliminary set of data points for the second variable and the second set of data points for the first variable.

6. The method of claim 1, wherein displaying the second graphing area includes displaying the second graphing area concurrently with the first graphing area.

7. The method of claim 1, wherein the first set of data points for the first variable represents historical data and the second set of data points for the first variable represents future data.

8. The method of claim 1, wherein the first set of data points for the first variable represents incomplete data and the second set of data points for the first variable represents bridging data.

9. The method of claim 1, further comprising detecting, via the one or more input devices, a user input indicative of a confidence of the path.

10. The method of claim 9, wherein displaying, on the display device, the second graphing area presenting a plot of the set of data points for the second variable includes displaying a confidence of the set of data points for the second variable.

11. The method of claim 1, further comprising detecting, via the one or more input devices, a user input corresponding to a selection of a sketch affordance that, when selected, activates a sketch mode, wherein determining, based on the path, the second set of data points for the first variable is performed in response to determining that the sketch mode is active.

12. The method of claim 1, further comprising detecting, via the one or more input devices, a user input corresponding to a selection of the second variable, wherein displaying a second graphing area presenting a plot of the set of data points for the second variable is performed in response to detecting the user input corresponding to a selection of the second variable.

13. An electronic device comprising:
   a display device;
   one or more input devices; and
   one or more processors configured to:

display, on the display device, a first graphing area including a first section presenting a plot of a first set of data points for a first variable and a second section;

while displaying the first section presenting the plot of the first set of data points for the first variable:
  detect, via the one or more input devices, a user input moving within the second section to define a path;
  determine, based on the path, a second set of data points for the first variable; and
  display, on the display device, the second section presenting a plot of the second set of data points for the first variable;

determine, based at least on the second set of data points for the first variable, a set of data points for a second variable; and display, on the display device, a second graphing area presenting a plot of the set of data points for the second variable.

14. The electronic device of claim 13, wherein the one or more processors are configured to determine the set of data points for the second variable further based on the first set of data points for the first variable and/or another set of data points for the second variable.

15. The electronic device of claim 13, wherein the one or more processors are further configured to display, on the display device, the second section presenting a plot of the second set of data points for the first variable.

16. The electronic device of claim 13, wherein the one or more processors are further configured to, prior to detecting the user input:
  determine, based on the first set of data points for the first variable, a preliminary set of data points for the second variable; and
  display, on the display device, the second graphing area presenting a plot of the preliminary set of data points for the second variable.

17. A non-transitory computer-readable medium encoding instructions which, when executed by a processor of an electronic device including a display device and one or more input devices, causes the electronic device to:
  display, on the display device, a first graphing area including a first section presenting a plot of a first set of data points for a first variable and a second section;
  while displaying the first section presenting the plot of the first set of data points for the first variable:
    detect, via the one or more input devices, a user input moving within the second section to define a path;
    determine, based on the path, a second set of data points for the first variable; and
    display, on the display device, the second section presenting a plot of the second set of data points for the first variable;
  determine, based at least on the second set of data points for the first variable, a set of data points for a second variable; and
  display, on the display device, a second graphing area presenting a plot of the set of data points for the second variable.

18. The non-transitory computer-readable medium of claim 17, wherein the instructions, when executed, cause the electronic device to determine the set of data points for the second variable further based on the first set of data points for the first variable and/or another set of data points for the second variable.

19. The non-transitory computer-readable medium of claim 17, wherein the instructions, when executed, further cause the electronic device to, prior to detecting the user input:
  determine, based on the first set of data points for the first variable, a preliminary set of data points for the second variable; and
  display, on the display device, the second graphing area presenting a plot of the preliminary set of data points for the second variable.

* * * * *